(12) United States Patent
Humphrey

(10) Patent No.: US 7,295,919 B2
(45) Date of Patent: Nov. 13, 2007

(54) SYSTEM FOR DELIVERING PROPANE OR OTHER CONSUMABLE LIQUID TO REMOTELY LOCATED STORAGE TANKS

(75) Inventor: Richard L. Humphrey, Eddyville, KY (US)

(73) Assignee: Nas Corp., Goodlettsville, TN (US)

( * ) Notice: Subject to any disclaimer, the term of this patent is extended or adjusted under 35 U.S.C. 154(b) by 0 days.

(21) Appl. No.: 11/097,964

(22) Filed: Apr. 1, 2005

(65) Prior Publication Data

US 2006/0015543 A1 Jan. 19, 2006

Related U.S. Application Data

(60) Provisional application No. 60/558,852, filed on Apr. 3, 2004.

(51) Int. Cl.
*G01C 21/00* (2006.01)
(52) U.S. Cl. .................. 701/202; 701/214; 701/220; 73/53.01
(58) Field of Classification Search .............. 701/202, 701/214, 220, 300; 73/53.01; 705/7, 26; 702/45
See application file for complete search history.

(56) References Cited

U.S. PATENT DOCUMENTS

| | | | |
|---|---|---|---|
| 5,023,806 A | 6/1991 | Patel | |
| 5,133,005 A | 7/1992 | Kelley et al. | |
| 5,161,184 A | 11/1992 | Smith et al. | |
| 5,558,636 A | 9/1996 | Li et al. | |
| 5,656,010 A | 8/1997 | Li et al. | |
| 5,790,653 A | 8/1998 | Fairbanks, Sr. et al. | |
| 5,913,180 A * | 6/1999 | Ryan | 702/45 |
| 5,943,420 A | 8/1999 | Bonhomme et al. | |
| 6,137,276 A | 10/2000 | Rudolph | |

(Continued)

OTHER PUBLICATIONS

A Certificate of Conformity dated Jul. 23, 2002 issued by the Engineering, Testing and Certification Centre, administered by Standards Australia Quality Assurance Services relating to components of the GASLOG monitoring and management system of dilicon Controls Pty Ltd. (4 pp.).

(Continued)

*Primary Examiner*—Gertrude A. Jeanglaude
(74) *Attorney, Agent, or Firm*—Scheinberg & Griner, LLP.; David Griner

(57) ABSTRACT

An improved system for delivering propane or other consumable liquid to remotely located storage tanks including a novel combination of remote monitoring of customer tanks and an improved method of using the remote monitoring data to optimally schedule deliveries, improve safety, and more efficiently operate a propane dealership. More accurate and timely information concerning the status of customer tanks serves to improve operational efficiencies and increase safety. Data received from remote sensors can be collected and organized so that it is easily understood and utilized through the implementation of a user interface accessible via the Internet that allows the information to be presented in an efficient graphical and contextual fashion. Operational efficiencies can also be improved by taking historical propane usage for each tank, weather conditions, and projected fuel usage into account. The system can calendar required inspections of customer tanks, homes, and appliances, and data can be combined with accounts receivable information. Remote monitoring of customer tanks can be combined with other products using similar equipment to provide additional non-seasonal revenue streams.

22 Claims, 9 Drawing Sheets

U.S. PATENT DOCUMENTS

2004/0153370 A1* 8/2004 Yang .......................... 705/26
2004/0204870 A1* 10/2004 Schimnowski et al. ....... 702/45

OTHER PUBLICATIONS

An IECEx Assessment and Test Report dated Jul. 5, 2002 issued by the International Electrotechnical Commission relating to the then GASLOG transmitter of Silicon Controls Pty Ltd. (2 pp.).

Invoice dated Aug. 12, 2003 issued by Silicon Controls Pty Ltd. to Blossman Gas, Inc. relating to components of a GASLOG installation purchased by Blossman. (1 p.).

A report prepared and published by the Propane Education & Research Council (PERC) dated May 2005 entitled "Remote Propane Tank-Level Monitoring Systems." (12 pp.).

An advice dated Sep. 24, 2003 issued by Underwriters Laboratories, Inc. to Silicon Controls Pty Ltd. relating to inspection and approval of the safety of their GASLOG Transmitter SC434C311x. (2 pp.).

A document entitled "Gaslog Overview" dated with a Copyright notice of 2002 setting out details of that product of Silicon Controls Pty Ltd. as it existed at that time. (6 pp.).

Gaslog Installation and Maintenance Guide from 2002. (36 pp.).

* cited by examiner

Linden's Propane, Inc.

Schedule Results...

Delivery

| Stop | Unit S/N | Address | Customer | Capacity | Deliver |
|---|---|---|---|---|---|
| 1 | GGF-123-698-BBNK | 78 Peter Piper Rd | Smith | 100 gals | 64 gals |
| 2 | TTTP-877-GHFC-43 | 675 Prairie Vista | Johnson | 600 gals | 378 gals |
| 3 | 55478-552236 | 15839 Chestnut Ln | Williams | 750 gals | 412 gals |
| 4 | RED-7786-MNJ-16 | 12 E.Althea Rd | Jones | 900 gals | 459 gals |
| 5 | JJ-0000-A18-4Q | 12 E. 7th St. | Brown | 400 gals | 200 gals |
| 6 | NMLS-9321-SLW-998 | 998 Oak Lane | Davis | 500 gals | 365 gals |

Route

| Stop | Arrive | Address | Distance |
|---|---|---|---|
| 2 | 08:35:36 AM | 12 E. 7th St. | 6.02 miles |
| 3 | 09:25:27 | 998 Oak Lane | 17.92 miles |
| 4 | 10:18:48 | 12 E.Althea Rd | 18.03 miles |
| 5 | 11:59:30 | 675 Prairie Vista | 40.76 miles |
| 6 | 01:22:34 | 78 Peter Piper Rd | 32.57 miles |
| 7 | 02:18:22 | 15839 Chestnut Ln | 20.1 miles |
| H | | Home | 16.78 miles |

FIG. 5

Linden's Propane, Inc.

Sky Tracker Propane Delivery Management

Schedule Delivery . . .

Select Available Trucks

|   | Truck # | Capacity | Location | Last Delivery | Last delivery Time |
|---|---|---|---|---|---|
| ✔ | 180-5G-252 | 3000 gal | At Customer | Thompson | Thursday 1-22-2004 |
|   | 180-5A-709 | 2500 gal | On Route |   |   |
|   | 180-5R-024 | 6000 gal | On Route |   |   |
| ✔ | 300-5G-252 | 3500 gal | In Yard |   |   |
|   | Rick's Big Tanker | 9000 gal | At Customer |   |   |

Select Delivery Customers

|   | Unit S/N | Customer | Capacity | Fill | Status | Report |
|---|---|---|---|---|---|---|
| ✔ | NMLS-9321-SLW-998 | Davis | 500 gals | 35 gal | 7% |   |
| ✔ | GGF-123-698-BBNK | Smith | 100 gals | 16 gal | | |
| ✔ | TTTP-877-GHFC-43 | Johnson | 600 gals | 102 gal | | |
| ✔ | 55478-552236 | Williams | 750 gals | 187.5 gal | 25% |   |
| ✔ | RED-7786-MNJ-16 | Jones | 900 gals | 261 gal | 29% |   |
|   | JJ-0000-A18-4Q | Brown | 400 gals | 120 gal | 30% |   |

FIG. 6

SYSTEM FOR DELIVERING PROPANE OR OTHER CONSUMABLE LIQUID TO REMOTELY LOCATED STORAGE TANKS

This application claims priority from U.S. Prov. Pat. App. 60/558,852, filed Apr. 3, 2004, which is hereby incorporated by reference.

TECHNICAL FIELD OF THE INVENTION

The present invention relates to an improved system for delivering propane or other consumable liquid to remotely located storage tanks.

BACKGROUND AND SUMMARY OF THE INVENTION

Propane is a gas, a derivative of natural gas and petroleum. It is one of the many fossil fuels that are included in the liquefied petroleum (LP) gas family. Because propane is the type of LP-gas most commonly used in the United States, propane and LP-gas are often used synonymously.

Under normal atmospheric pressure and temperature, propane is a gas. Under moderate pressure and/or lower temperatures, however, propane changes into a liquid. Because Propane takes up much less space in its liquid form, it is easily stored as a liquid in pressurized tanks. When propane vapor (gas) is drawn from a tank, some of the liquid in the tank instantly vaporizes to replace the vapor that was removed.

Homes and businesses use about one-third of the propane consumed in the U.S. Propane is used mostly in homes in rural areas that do not have natural gas service. More than 20 million households use propane to meet some of their energy needs, while 16 million households use propane as their main heating source. Homes that use propane as a main energy source usually have a large propane tank outside of the house that stores propane under pressure as a liquid.

Because home space heating is a primary use of propane, demand is much higher during the winter months. Residential users of propane typically have a 250-500 gallon tank installed by a local propane dealer and accessible to delivery trucks for refilling. Depending on the climate, a typical residential tank is filled three to four times per year. A residential tank is usually owned by the propane dealer and rented to the residential customer for an annual fee.

Propane dealers typically operate out of bulk storage plants that include one to two 30,000 gallon storage tanks. A single dealer will usually be able to effectively service a 35 mile radius around the plant, though in less populated regions a much larger service area may be necessary to achieve sufficient volume. Propane is delivered to customers by bulk delivery trucks or "bobtails" which typically hold from 1,800 to 3,000 gallons of propane. Customer tanks usually make up the largest portion of a dealer's assets.

Obviously, different size tanks and different usage rates for customers over a large area can make it very challenging for a dealer to keep all of his customers' tanks filled. The quantity of liquid propane stored and remaining on customer propane tanks needs to be measured frequently so that the propane dealer can manage his own inventory of bulk propane, efficiently schedule deliveries, and most importantly keep his customers supplied with propane. There are also significant safety concerns associated with propane tank levels since empty or overfilled tanks can be very dangerous. Further, costs associated with delivery, including wages for delivery personnel and vehicle operation and fuel costs, are a significant portion of a dealers's operating expenses. For this reason, dealers must try to maximize the ratio of gallons of delivered propane per mile traveled by delivery vehicles in order to lower delivery costs.

Traditionally, the standard practice was for propane dealers to periodically visit each tank and visually read a gauge located on the tank in order to determine whether the tank needed refilling. If the tank level was low, it would be refilled; if not, the delivery truck had essentially wasted a trip. As could be expected, this highly inefficient practice contributed to higher costs, both for the dealer and the customers.

For this reason, a number of forecasting methods were developed to give dealers a better idea of how much propane a customer was using and when more should be delivered. Since propane is primarily used as a heating fuel, the typical forecasting method involved factoring temperature and historic customer usage rates. A Degree Day is a unit used to measure how cold it has been over a 24 hour period. The base temperature for Degree-Day calculations is 65 degrees. The actual temperature is compared to the 65° base temperature and if the temperature is lower, the difference is the number of Degree-Days for that day. For example, if the average temperature for a 24 hour period was 60°, that would be 5° less than the base temperature of 65°, so we would have 5 Degree-Days for that 24 hour period. Another concept, referred to as the K-factor, is used to get an idea of the propane usage rate for a customer. The customer's K-factor is the number of Degree-Days that it takes for a given customer (or burner(s) associated with a given tank) to use one gallon of propane.

From these two measurements, a dealer could get a better idea as to when more propane should be delivered. For example, a customer with a 275 gallon propane tank with a historic K-factor of 5 could be expected to go 1375 Degree-Days before the tank is empty. However, since an empty tank is a dangerous condition (plus it means the customer is out of fuel) delivery will need to be made before the 1375 Degree-Days have elapsed. Further, these types of forecasting methods cannot account for unexpected periods of higher or lower than normal propane usage. Since this kind of forecasting is merely an estimate, a substantial margin of error must be built into the delivery schedule. This results in more deliveries of lower amounts of propane and consequently higher dealer delivery costs.

For many years, various optimal vehicle routing computer programs have been available to minimize the mileage and travel time associated with making desired deliveries using vehicles with known capacities. All such methods in the prior art, however, necessarily depend upon various methods of forecasting a customer's propane usage since the last delivery and, as discussed above, such forecasting methods are never completely reliable.

More recently, remote monitoring systems have been used to allow remote transmission of data relating to the level of the liquid gas contained in customer tanks. This allows for the delivery of fuel or other fluids to the storage tank on an "as-needed" basis. Such monitoring systems are typically more accurate than forecasting systems and increase the efficiencies of the propane supplier.

Storage tank monitoring systems currently in use typically include a float sensor within a storage tank that measures the level of fluid and the temperature within the storage tank. For remote monitoring systems, data from the sensor is transmitted through some type of communication network to a data processing unit or display device. Typically, the data processing unit is a computer that decodes and stores the data using specialized software. The information received by the data processing unit provides for the monitoring of each specific storage tank individually.

One remote monitoring system known in the prior art makes use of RF broadcasting to communicate data from the sensor to the data processing unit. Such systems are relatively inexpensive, however, they have very limited range. The data processing unit would typically be mounted in a delivery truck which would have to be in the vicinity of the customer's tank for the level to be reported.

Another prior art system uses a modem and ordinary telephone lines to communicate data from the sensor to the data processing unit. Typically, such a system will use the modem to call in and signal the data processing unit when the propane in a tank reaches a pre-determined level. The customer's phone line must be free for the system to work.

Other prior art systems used to monitor liquid volume in tanks make use of satellite or cellular communications. However, each of these systems also suffers from disadvantages in certain circumstances. For example, many satellite systems require an externally mounted satellite dish with the proper exposure. Additionally, two-way communication requires expensive equipment and installation. Cellular systems are not practical in certain locations due to a lack of cellular coverage.

No matter which communication scheme is used, the data received from the sensor is often confusing and can require significant time to decode and format into a useful form. Even then, it is still difficult for a dealer to interpret the data or use the information to optimally organize his trucks and routes. Further, a dealer must be able to access the data processing unit in order to make use of the data, and this typically requires that the dealer be physically in his office in order to monitor his business. Also, certain tank conditions, such as an over-fill, require immediate attention. For events occurring outside ordinary business hours, either the dealer must have an employee monitoring the system 24 hours a day or else these events will not be corrected until the next business day.

Propane dealers also face economic challenges arising from the seasonal nature of propane demand. As discussed above, demand for propane is high during the winter months, but much lower during summer. The propane dealer has a significant investment in tanks, trucks, employees, and infrastructure, and yet he receives a poor return on this investment during periods of low demand.

What is needed is a system that combines remotely monitoring levels in customer tanks with an improved method of using the remote monitoring data to optimally schedule deliveries and more efficiently operate a propane dealership. Additionally, there is a need for a way to combine such an improved operational method with additional revenue streams that make use of the same infrastructure to generate additional revenue especially during periods when propane demand is low.

SUMMARY OF THE INVENTION

An object of the invention, therefore, is to provide an improved system for delivering propane or other consumable liquid to remotely located storage tanks. This goal is achieved through a novel combination of remote monitoring of customer tanks and an improved method of using the remote monitoring data to optimally schedule deliveries, improve safety, and more efficiently operate a propane dealership.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a typical delivery schedule screen according to the present invention.

FIG. 6 is a typical delivery truck routing screen according to the present invention.

DETAILED DESCRIPTION OF PREFERRED EMBODIMENTS

A preferred embodiment of this invention provides a novel system and method for an improved system to coordinating the delivery of a liquid to remotely located storage tanks.

In accordance with another aspect of a preferred embodiment of the present invention, an agnostic communication scheme can be used for remote monitoring of liquid gas levels in storage tanks. Thus, communication does not have to be limited to a single communication platform. Any known suitable communication scheme can be employed to transmit data, such as cellular, land phone lines, wireless, satellite, cable, etc. Different communication schemes can be employed for different customers or tank locations, depending on which scheme is optimal for the individual client or location. Selection of an optimal communication network can be based upon factors such as location, availability of cellular signal, availability of telephone lines, and desired equipment investment by customer.

Figure 1:
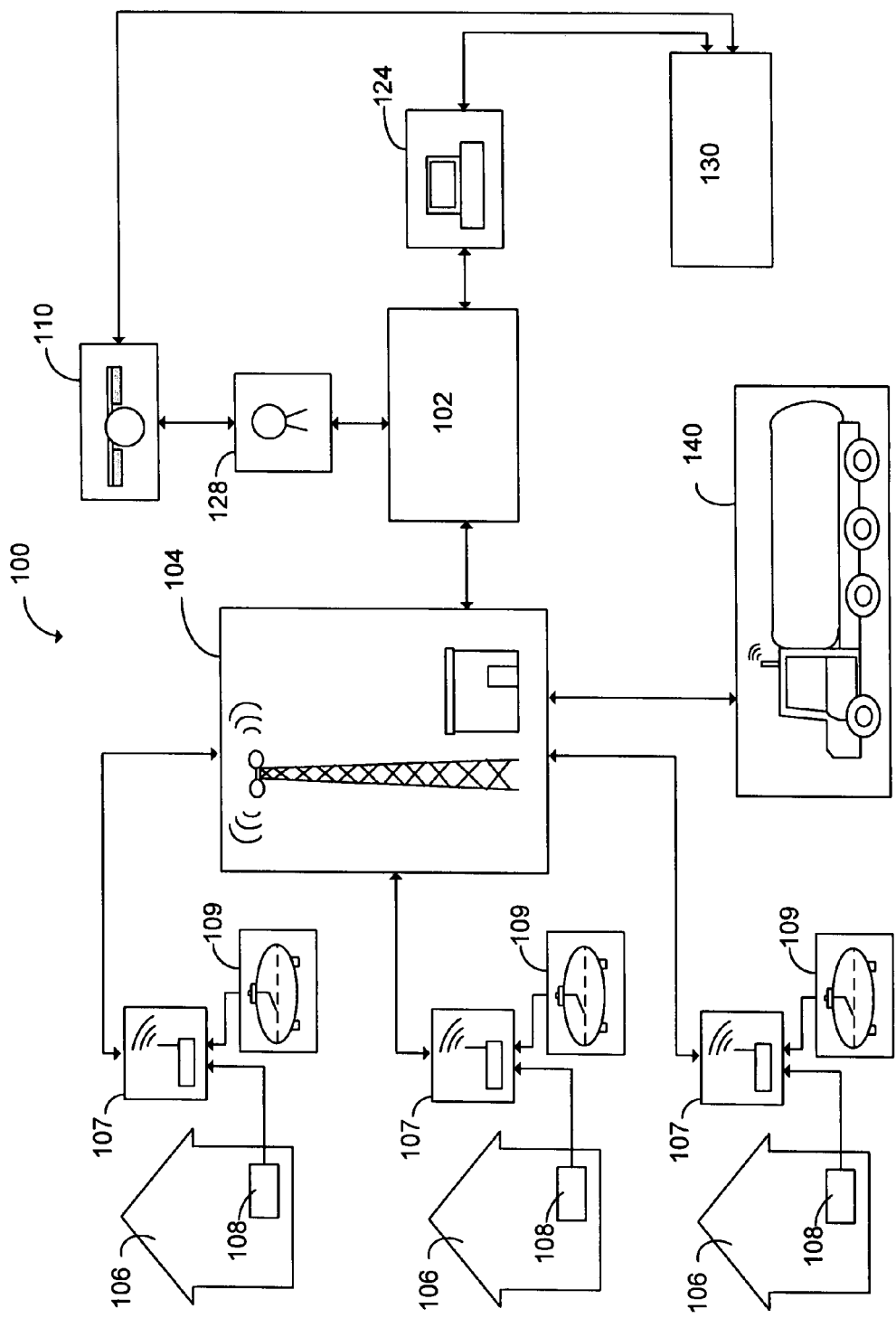
FIG. 1 shows a preferred embodiment of a remote propane monitoring system according to the present invention where a cellular communication scheme is employed.

FIG. 1 shows one aspect of a preferred embodiment of a remote propane monitoring system 100 according to the present invention where a cellular communication scheme is employed to transfer data between a storage tank monitoring unit and the central server. Remote propane monitoring system 100 comprises central processing station 102 which communicates with a plurality of monitoring units 107 located at customer sites 106 by way of one or more cellular towers 104. Communication between central server 102 and monitoring units 107 is preferably two-way communication. As discussed in greater detail below, monitoring units collect data from the propane tank sensor and optionally from one or more home monitoring sensors 108 and transfer fluid level data to the central server 102. Data can then be organized and processed (as also discussed below) and transferred from central server 102 through satellite up-link 128 to satellite 110 and/or through web server 124 to the Internet or a suitable intranet. Central server 102 can comprise one or more computers at one or more locations. End-user 130 can then access data through a wireless satellite link or through the Internet, for example by using a personal computer with Internet access. Central server 102 can also communicate with delivery trucks 140 by way of cellular towers 104.

Figure 2:
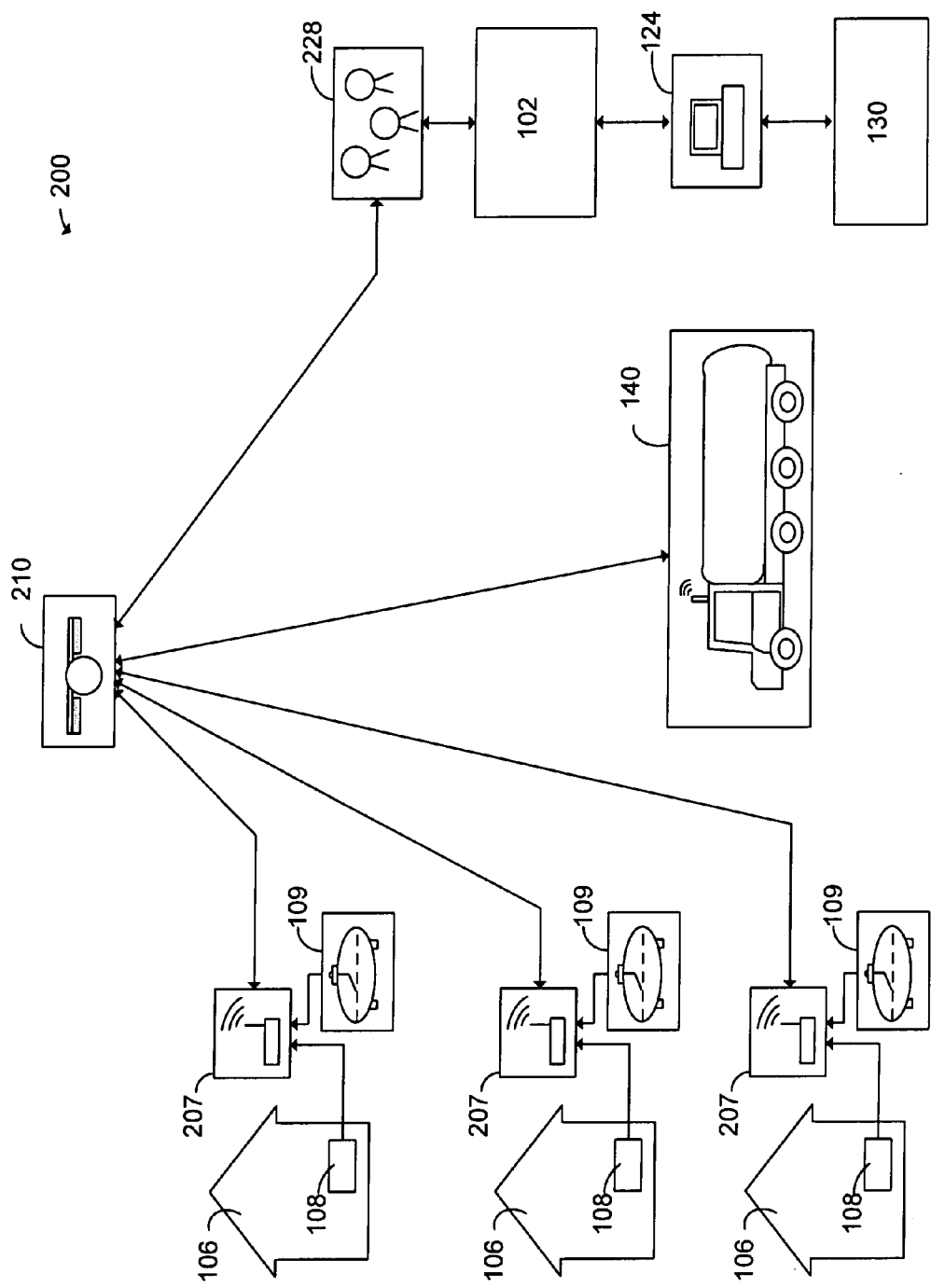
FIG. 2 shows a preferred embodiment of a remote propane monitoring system according to the present invention where a satellite communication scheme is employed.

FIG. 2 shows another preferred embodiment of a remote propane monitoring system 200 according to the present invention where a satellite communication scheme is employed to transfer data between a storage tank monitoring unit and the central server. Remote propane monitoring system 200 comprises central server 102 which communicates with a plurality of monitoring units 207 located at customer sites 106 by way of satellite 210. Monitoring units 207 can communicate with satellite 210 by way of a satellite modem and antenna (not shown). In the embodiment shown in FIG. 2 communication is one-way from the monitoring units 207 to the satellite 210. Even more preferably, however, communication between monitoring units 207 and satellite 210 can be two-way communication. As discussed in greater detail below, monitoring units collect data from the propane tank sensor and optionally from one or more home monitoring sensors 108 and transfer fluid level data to the satellite 210. Data is then transferred to central server 102 by way of satellite up-link 228. Data can then be organized and processed (as also discussed below) and transferred from central server 102 through web server 224 to the Internet or a suitable intranet. End-user 130 can then access data through the Internet or suitable intranet, for example by using a personal computer with Internet access. Optionally, monitoring units on delivery trucks 140 can also communicate with the central server 102 by way of the satellite 210 and satellite up-link 228.

Figure 3:
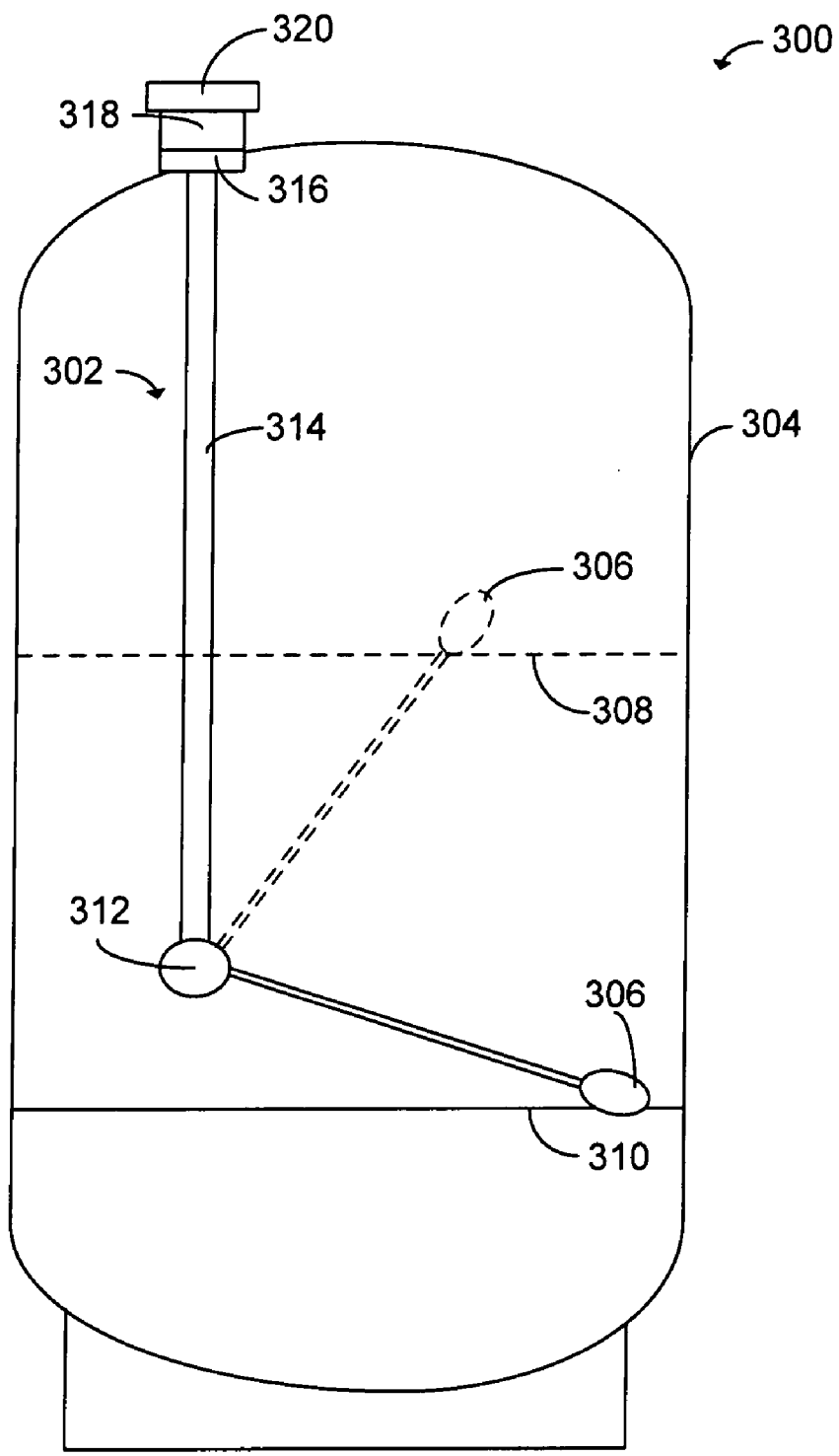
FIG. 3 shows a typical prior art liquid storage tank and float gauge.

Tank levels can be monitored by a number of different mechanisms known in the prior art. For example, one common type of gauge is known as a float gauge. As the name suggests, a float gauge has a float that rests on the surface of the fluid being measured. The position of the float will rise or fall as the level of liquid in the tank is changed. Movement of the float is sensed by a gauge, typically through the use of a magnetic coupling, to provide an indication, either visual or otherwise, of the fluid level. A typical float gauge and propane tank combination 300 is shown in FIG. 3. Float assembly 302 is mounted inside tank 304. As illustrated in FIG. 3, the position of float 306 will vary with the liquid levels 308 and 310 in the tank. The float assembly 302 represents the attachment mechanism through which the sensor unit of the present invention detects the level of the propane inside the tanks. Vertical movement of the float as it follows the level of the liquid is converted into rotational movement by a pinion 312 which rotates a shaft extending inside tube 314 and turns a master magnet 316. The float assembly 302 attaches by the float head 318 under a pressure seal. A dial gauge 320 is mounted onto the float head 318.

The dial gauge 320 will preferably comprise a dial chamber with a remote sender that gives a visual indication of tank levels while also sending an electrical signal to a monitoring unit. This electrical signal serves to give a remote indication of the tank levels.

Figure 4:
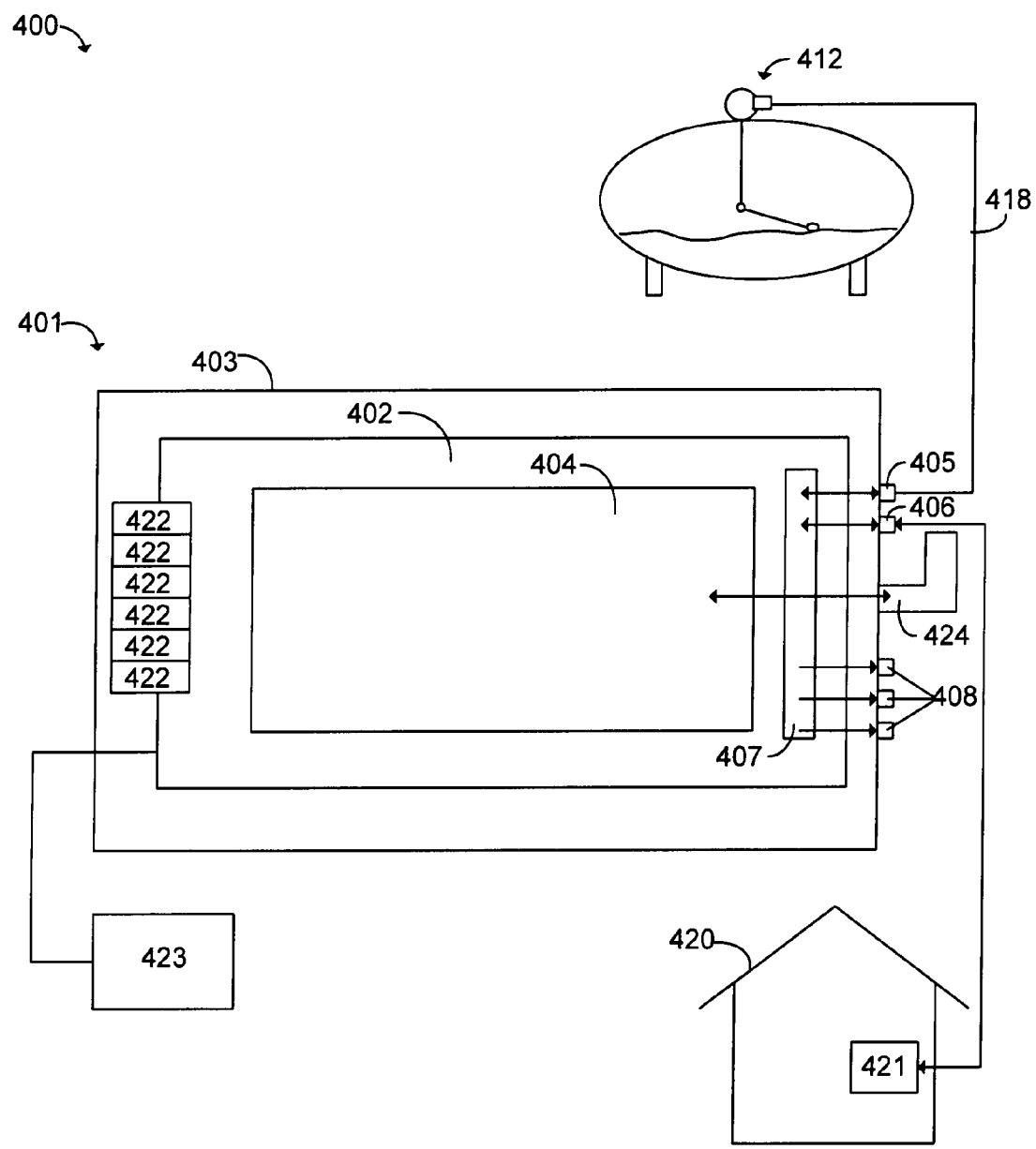
FIG. 4 shows a preferred embodiment of a monitoring unit for use with a cellular communication scheme.

FIG. 4 shows a preferred embodiment of a local customer monitoring system 400 according to the present invention. Monitoring unit 401 comprises a sealed case 403 containing processor 402 and at least one associated communication device 404, such as a cellular modem, line modem or satellite communication device. Communication device 404 can be connected to external antenna 424. Processor 402 and associated communication device 404 are preferably powered by batteries 422 or optional external power supply 423, and communicate with one or more propane tank sensors 412 through I/O port 405. Status and troubleshooting information can be displayed externally via LEDs 408.

Processor 402 comprises circuitry for implementing the following functions: receiving data from the one or more propane tank sensors 412; processing the data, and converting it into readable form if necessary; at preselected intervals or times, connecting to the central server (not shown) through the associated communication device 404 and external antenna 424 to transfer collected data; and determining whether predefined conditions have occurred, such as a low liquid level or an overfill, or whether predefined abnormal or "out of ordinary" events have occurred, such as liquid levels dropping too fast (possibly indicating a leak) or not dropping at all (indicating a possible problem with the tank sensor). Skilled persons will recognize that said circuitry can be implemented with conventional processors and/or controllers, integrated circuits, discrete devices, or any combination of the same.

Processor 402 can communicate with tank level sensor 412 by way of a direct wire connection 418, I/0 port 406, and communication bus 407. In a preferred embodiment, a second I/O port allows for X-10 functionality as discussed below. Processor 402 can also communicate with a plurality of additional secondary sensors. For example, data can be collected from one or more home monitoring sensors 421 capable of detecting Carbon Monoxide, propane gas, or variations in temperature inside the customer's home. Data from these types of additional sensors can be transmitted to the central server along with data on propane tank levels. Communication between monitoring unit 401 and home monitoring sensors 421 can be through any appropriate means, including X-10, RF, or direct wiring.

Preferably case 403 will be sealed to protect the sending unit from adverse environmental conditions. In the event of mechanical failure, the entire unit can be easily replaced. In a preferred embodiment, the monitoring unit of FIG. 4 will also provide I/O functionality (including data ports allowing the monitoring unit to communicate with X-10 devices or the customer's personal computer). Although any appropriate communication device can be used with the present invention, in a preferred embodiment the unit will have a primary communication device, such as a cellular modem, and a backup device, such as a land line modem.

Monitoring unit 401 can be operated by any appropriate power source, including direct wiring, battery packs, or solar chargers. Depending on the power source, the communication device can be configured to operate in different modes. Preferably, for example, a monitoring unit which uses a radio (RF) transmitter and is powered by a battery pack would be configured so that the radio is powered off most of the time in order to conserve power. Processor 402 would periodically wake up the radio so that incoming commands can be received.

In a preferred embodiment, monitoring unit 401 could collect data and report to the central server once per day at a particular time, for example at 3:00 a.m. In the case of cellular transmission, this would typically allow a dealer to negotiate a cheaper cellular rate plan since most transmissions will not occur during peak cellular times. If land line communication is used, reporting at 3:00 a.m. should limit the potential interference with the customer's use of the telephone line. Additionally, as discussed above, monitoring unit could be configured to report immediately if certain types of conditions occur, including for example, overfilled tanks, greater than expected usage (which could indicate a leak), low battery, or any other "out of ordinary" condition.

In accordance with another aspect of a preferred embodiment of the present invention, data can be queued until it is reported. This would allow the collection of very detailed data, for example hourly tank levels, while minimizing connect time. This would also allow the communication system to be more tolerant of communication faults since data would be stored until a satisfactory communication is established.

In accordance with another aspect of a preferred embodiment of the present invention, data received from the tank sensors can be collected and organized so that it is easily understood and utilized by the propane dealer through the implementation of a user interface which allows the propane dealer to see each customer's current status in a graphical and contextual way. This improves the ability of the propane dealer to analyze and react to data quickly and easily without the necessity of reviewing voluminous data which is not organized in an optimum order.

For example, in a preferred embodiment, basic information and history would be accessible for each customer or each storage tank. A color-coded tank inventory can be graphically displayed so that a dealer can see a list of customers and tank levels and at a glance tell the status of each customer's tank. FIG. 5 is a typical delivery schedule according to the present invention. This screen shows the delivery vehicles selected for use and the customers scheduled for delivery. In a preferred embodiment, a program running on the central server makes the selection according to user-defined criteria. An authorized user can override the program's selections from this screen. A customer tank inventory is graphically displaed so that fluid levels can be easily seen. Tanks with sufficient propane levels can be indicated with a selected screen color, for example with icons or graphical shapes of a particular color. Tanks which need refilling can be shown through the use of a different screen color. Over-filled tanks can be shown through the use of a third screen color.

FIG. 6 is a typical delivery truck routing screen according to the present invention. Each stop on the scheduled delivery route is shown in order with the physical address, tank capacity, and scheduled delivery amount. Estimated time of delivery and distance between stops can also be shown.

Figure 7:
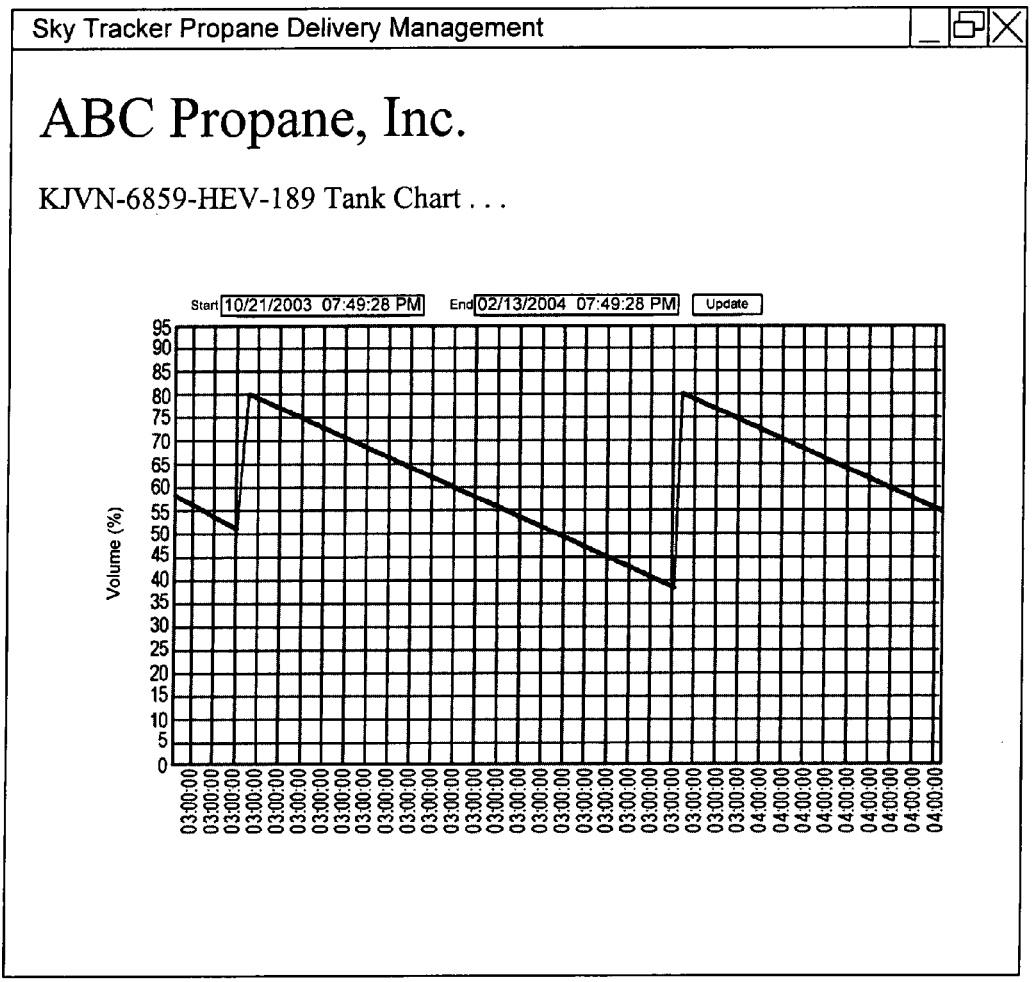
FIG. 7 is a daily posted customer tank inventory chart according to the present invention.

A daily posted customer tank inventory chart, as illustrated in FIG. 7, will preferably allow the dealer to recognize customer use trends and detect any anomalies, such as an unauthorized tank fill or pump-out. This chart graphically displays the fluid level in a customer's tank over a defined time period, for example over a four month period. This allows the dealer to immediately identify the refill dates and to see if there is any drastic change in usage rates.

Figure 8A:
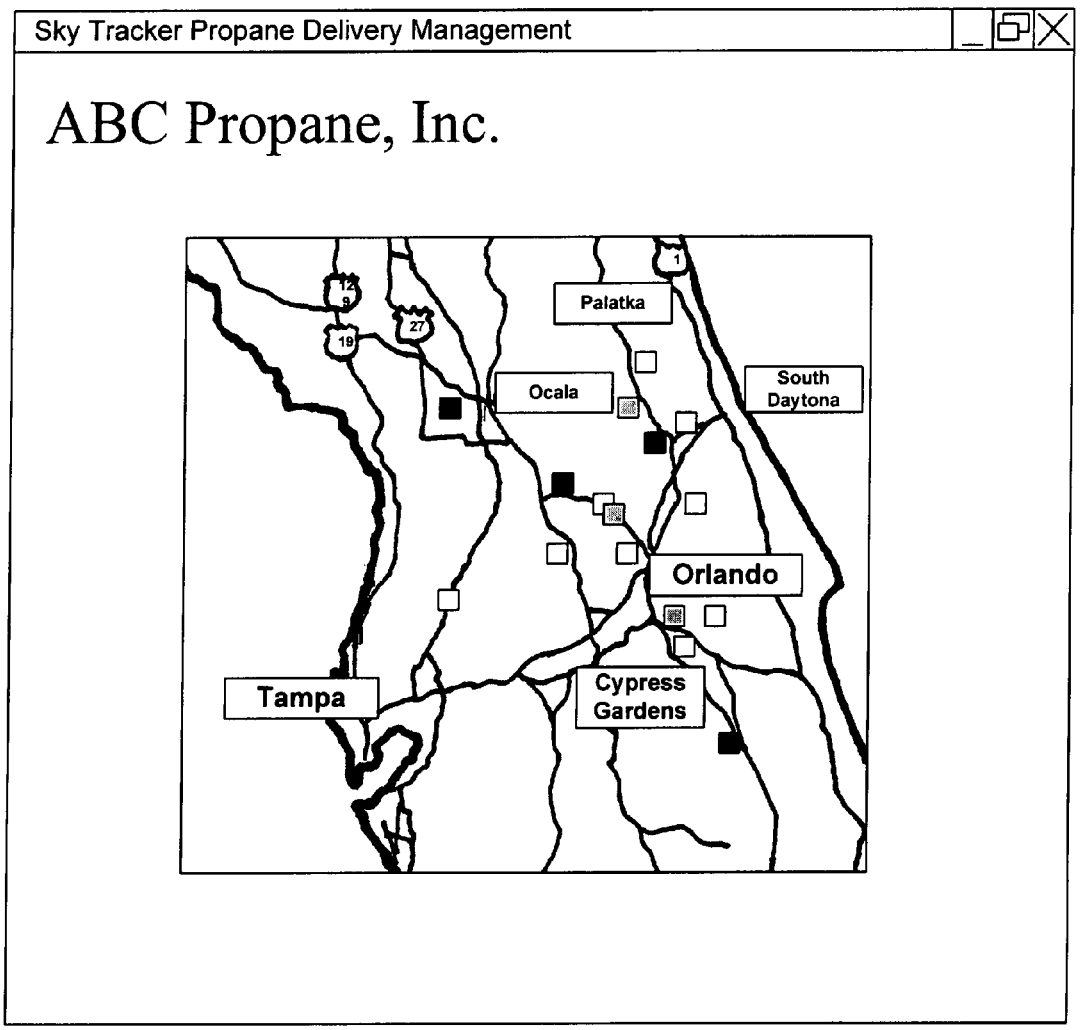
FIG. 8A is a geographic satellite view of a dealer's customer tanks and their current levels.
Figure 8B:
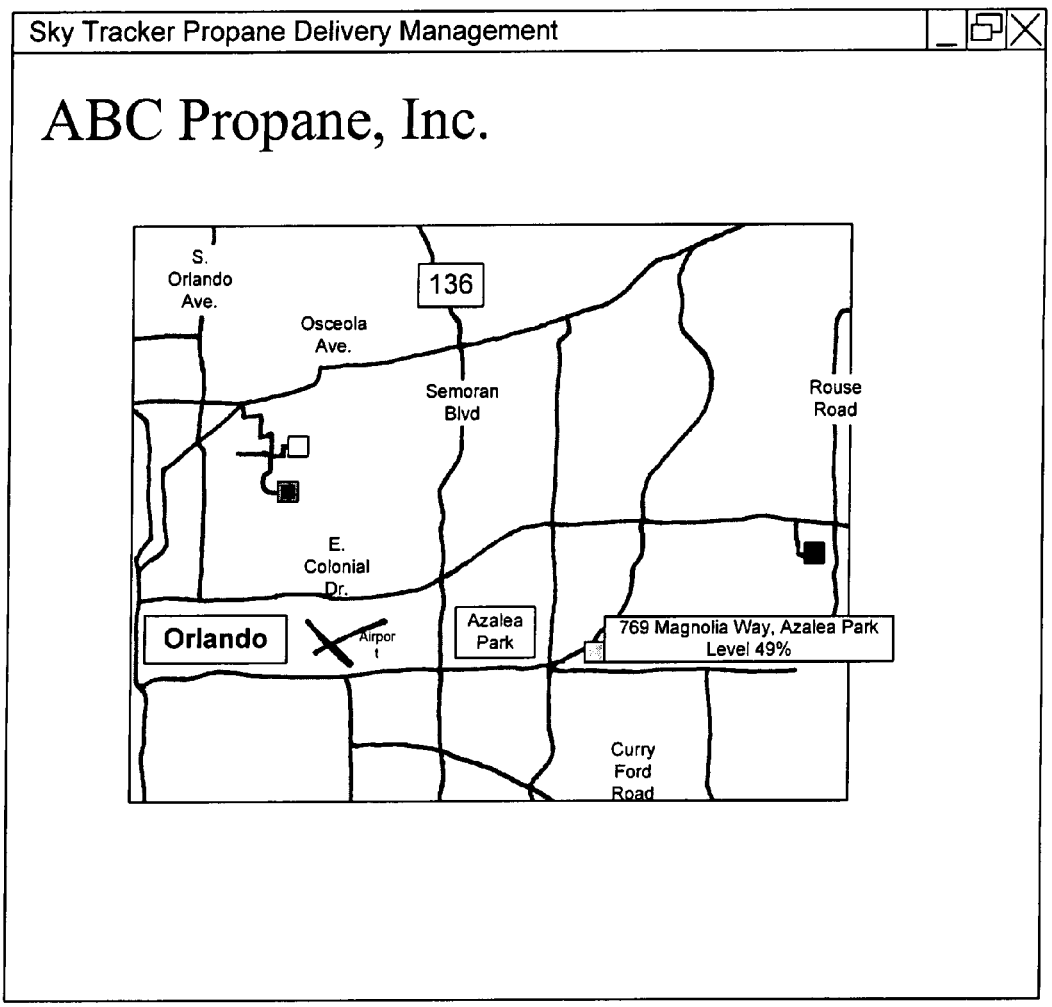
FIG. 8B is the geographic satellite view of claim 8A zoomed in to show an customer.

In accordance with another aspect of a preferred embodiment of the present invention, color-coded data can also be displayed on a map that shows the location and status of each tank. This would also provide for easy printing of routes and customer locations for drivers. Data received from customer tanks would automatically be used to create color-coded liquid level tank information lists accessible by the propane dealer. Custom color-coded maps showing customer locations on each delivery route can be accessed via the Internet and displayed to a PC screen and printed by delivery personnel. This allows a dealer to have a geographic or "satellite" view of all of his customer tanks and current levels and to map delivery routes that most efficiently utilize the dealer's assets and ensure that customer needs are met. Preferably, maps will be able to show an entire customer base, as shown in FIG. 8A, or zoom in on a particular customer or route, as shown in FIG. 8B.

In accordance with another aspect of a preferred embodiment of the present invention, tank sensor data can be used to calculate the most efficient delivery truck routes. It is desirable to determine how much propane to load onto each truck, and what stops to deliver in a cost efficient manner. Utilizing relevant information, such as tank level data received from customers, information on delivery trucks and sizes, availability of trucks, and delivery location points, an adaptive algorithm would preferably match the needs of the customer database with the available delivery trucks and model the most efficient routes for each available truck. By increasing efficiency, dealers can make more economical use of their equipment and employees and can maximize gallons per mile and gallons per stop ratios. The modeling could also be predictive by taking historical propane usage for each tank, weather conditions, and projected fuel usage into account in determining which tanks should be refilled along a given delivery route. Historic, Degree Day, and Julian (Elapsed) Day forecasting can also be taken into account. A preferred embodiment could also include a scheduling system that would use the optimum route determination to provide fill tickets (specifying how much propane is to be loaded onto each truck) to the staff responsible for filling up each truck in the morning and to provide routing and delivery instructions for each driver.

In accordance with another aspect of a preferred embodiment of the present invention, the system can calendar required inspections of customer tanks, homes, and appliances, as required by industry standards, either after an event, such as an out of gas situation, or after a proscribed period of time as passed. The volatile nature of propane gas creates the potential for serious ramifications to occur should a leaking pipe or joint develop. Dangerous conditions may also exist where appliances or heating units with open flames are exposed to uncontrolled fuel. Pressure testing the entire propane system, inspecting the tank, piping, regulator, gauges, connectors, valves, vents, thermostats, pilots, burners and appliance controls on a regular schedule or after an out of ordinary event occurs can significantly reduce the possibility of loss of life or property damage. The system will have the capability to alert the propane dealer and drivers to the need to perform required testing either on a regular timed basis or after the occurrence of an out of ordinary event.

In accordance with another aspect of a preferred embodiment of the present invention, data (in the form of customer information, tank inventories, or delivery information) can be combined with accounts receivable information. Customer accounts receivable balances can be displayed on a PC screen organized by route, or printed out on the color-coded route sheets discussed above. This preferably allows the dealer to arrange for payment before or on delivery or to reconfigure the delivery route where satisfactory payment arrangements cannot be made with customer.

One aspect of a preferred embodiment of the present invention is directed to a Web-based (Internet and Intranet) client-server application that enables dealers to access information relating to the monitoring of their propane tanks and inventories, along with information related to additional income producing services as discussed below. Data from remote sensors, along with the graphical and contextual organization of that data as discussed above, would thus preferably be available to end-users (for example, the propane dealer) by way of the Internet, or a LAN, WAN, or the like.

The end-user could choose to dedicate a computer monitor or monitors to the continually updated display of such information. Information may be stored on either the central server, a web server, or the end-users computer so that historical patterns and trends can be identified.

Additionally, dealers are preferably able to monitor, via a Web browser interface and in real-time, any alarms or out-of-ordinary events affecting their customers or business. In a preferred embodiment, alarm notices-such as a tank overfill notice, tank low level notice, an out-of-ordinary occurrence, or a variance from historic or Degree Day data and projections—can be posted on the Dealer log-in page. The dealer can also be notified of alarms by pager, text messaging, or email.

In accordance with another aspect of a preferred embodiment of the present invention, the use of interactive web-based managed services software, accessible by a number of dealers through individual passcode protected Web-site links, allows for across-the-board system upgrades and enhancements without requiring massive hardware or CD mailings.

In accordance with another aspect of a preferred embodiment of the present invention, the system for remote tank monitoring of propane tanks can be combined with other products using similar equipment in order to provide the propane dealer with additional non-seasonal revenue streams. As discussed above, propane business is seasonal, with highest demand occurring during the winter months. Although expensive monitoring equipment, which can include satellite, cellular, and land-line communication systems, is used primarily during periods of high demand, the equipment remains at the customer's location throughout the year. Similarly, a propane business will typically require a staff with a great deal of technical expertise, but that expertise is generally only put to use during high demand periods. During the off-season, these highly trained employees will typically be used for numerous non-technical tasks.

According to the present invention, a propane dealer can take advantage of the expertise of his employees and the existing monitoring equipment infrastructure to provide additional services to customers. For example, the equipment used for satellite communication of remote tank levels can also be used to provide a customer with satellite television or Internet service. The same employees who install and service satellite monitoring systems will be able to use their technical expertise to install and service satellite entertainment services.

In a preferred embodiment, X-10 functionality on the monitoring unit allows home monitoring and automation services to be transmitted with the same equipment used for tank monitoring (even where satellite equipment is not installed or is not available.) As is well known to those of ordinary skill in the art, the term X-10 refers to a standardized protocol accepted as an industry standard for communication between devices via AC power lines within a single facility. X-10 communicates between transmitters and receivers by sending and receiving signals over the AC power line wiring. These signals involve short RF bursts, which represent digital information. This X-10 functionality can be controlled by way of the customer's PC, and can easily be accessed through the Internet. As discussed above, in a preferred embodiment, the monitoring unit will have a port allowing the processor to interface with home monitoring sensors, such as X-10 devices. Other types of communication protocols and connections could also be used to connect home monitoring sensors to the monitoring unit, including wireless RF transmission or hard wired connections. This allows the propane dealer to also offer, for a relatively small equipment and training investment, home security and fire monitoring, home automation, and specialized monitoring which is desirable for propane customers such as Carbon Monoxide and propane gas monitoring inside the home.

By combining wireless entertainment and X-10 functionality with the tank monitoring system discussed herein, both monitoring and additional revenue-producing services preferably benefit from cost savings and increased efficiencies.

In accordance with another aspect of a preferred embodiment of the present invention, where more than one type of tank monitoring communication scheme could be used, the communication scheme can be matched to additional services desired by the customer, thus creating additional efficiencies and cost savings. For example, where the customer wishes to purchase satellite television or Internet services, the same satellite equipment could be used to provide the communication between the monitoring sensors and the data server.

Particular embodiments of the present invention are directed to an improved system and method for coordinating the delivery of a consumable liquid to remotely located storage tanks. Although much of the following description is directed toward propane storage and delivery, the present invention could be utilized with any type of consumable liquid commonly stored in liquid storage tanks, including natural gas or anhydrous ammonia. Hence, the scope of the present invention should not be limited to propane storage and delivery. Further, although much of this discussion is directed an economic model including a propane dealer servicing propane tanks located at customer sites, the system and methods discussed herein would be equally applicable to different economic models, including for example, a large corporation or other business entity servicing a large number of remote storage tanks from one or more central storage facilities.

Although the present invention and its advantages have been described in detail, it should be understood that various changes, substitutions and alterations can be made to the embodiments described herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described

We claim as follows:

1. A system for monitoring fluid levels of a consumable liquid in two or more remotely located storage tanks comprising:
   at least one monitoring unit associated with each storage tank and communicatively linked with a sensor mounted in association with each storage tank that provides fluid level information indicative of the amount of fluid in the storage tank, wherein each monitoring unit includes at least one processor to receive and process the received fluid level information;
   at least one central server remotely located from the two or more storage tanks to be communicatively linked with each monitoring unit and to receive processed fluid level information from each monitoring unit;
   wherein each monitoring unit processes the fluid level information indicative of the amount of fluid in the storage tank and communicates said information to the central server at predefined intervals;
   wherein each monitoring unit also processes said fluid level information to determine whether a predefined out-of-ordinary event has occurred and, if so, sends notice to the central server; and
   wherein the central server uses received fluid level information (i) to provide displayable fluid level data, and (ii) to forecast future fluid levels utilizing at least stored fluid level data.

2. The system of claim 1 further comprising a graphical user interface configured to download information to be displayed and to allow user input.

3. The system of claim 2 wherein the graphical user interface is an Internet web browser.

4. The system of claim 1 wherein said communications link comprises a cellular modem, a satellite communication system, a modem and telephone line, or an RF transmitter/receiver.

5. The system of claim 1 wherein said communications link comprises a primary communications link and a backup communications link to be used if the primary communications link is not operable.

6. The system of claim 1 wherein said determining whether a predefined out-of-ordinary event has occurred comprises comparing a change in fluid levels over a period of time to historic changes in fluid levels over the same period of time for the same tank or for similar tanks.

7. The system of claim 1 further comprising:
   one or more secondary sensors for detecting the occurrence of a local phenomena and transmitting a detection signal to at least one monitoring unit;
   one or more of the monitoring to receive a detection signal from secondary sensors, process the signal to determine whether the value is outside a predetermined range and, if so, send data concerning the detection signal through a communications link to the central server.

8. The system of claim 7 further comprising an audible alarm that sounds when said detection signal is transmitted by a secondary sensor.

9. The system of claim 7 wherein said one or more secondary sensors are capable of detecting local temperature, the presence of propane gas, or levels of carbon monoxide.

10. The system of claim 7 wherein one or more secondary sensors transmit data to a monitoring unit via X-10, radio frequency, infrared signals, or hard-wired connection.

11. The system of claim 1 wherein data to be sent from the monitoring unit to the central server is queued until a predetermined connect time.

12. The system of claim 1 wherein said central server comprises one or more computers at one or more physical locations executing software.

13. The system of claim 1 wherein information concerning fluid level data is organized and displayed graphically.

14. The system of claim 13 wherein displaying information graphically comprises displaying a tank inventory listing customers and corresponding fluid levels with levels above or below predetermined thresholds color-coded so that particular fluid ranges can be easily identified.

15. The system of claim 13 wherein displaying information graphically comprises displaying alarm messages whenever a remote monitoring unit has notified the central server that a predefined out-of-ordinary event has occurred.

16. The system of claim 15 further comprising sending alarm messages via pager, text messages, or email whenever a remote monitoring unit has notified the central server that a predefined out-of-ordinary event has occurred.

17. The system of claim 1 further comprising a computer executable program for scheduling required inspections of customer tanks, homes, and appliances, according to industry standards.

18. The system of claim 1 further comprising a computer executable program for combining delivery information with accounts receivable information.

19. The system of claim 1 wherein determining whether a predefined out-of-ordinary event has occurred comprises comparing the change in fluid levels in a storage tank over a period of time to predefined thresholds.

20. An apparatus for monitoring propane levels in two or more remotely located storage tanks comprising:
   at least one monitoring unit associated with each storage tank and communicatively linked with a sensor mounted in association with each storage tank that provides fluid level information indicative of the amount of propane in the storage tank, wherein each monitoring unit includes at least one processor to receive and process the received fluid level information;
   at least one central server remotely located from the two or more storage tanks to be communicatively linked with each monitoring unit;
   one or more secondary sensors capable of detecting local temperature, the presence of propane gas, or higher than normal levels of carbon monoxide and transmitting a detection signal to at least one monitoring unit;
   wherein at least one monitoring unit (i) processes the received fluid level information indicative of the amount of fluid in the storage tank and communicates said information to the central server at predefined intervals, (ii) processes propane level information to determine whether a predefined out-of-ordinary event has occurred and, if so, sends notice to the at least one central server, (iii) receives a detection signal from a secondary sensor, processes the signal to determine whether the value is outside a predetermined range and, if so, sends data concerning the detection signal through a communications link to the central server;
   the at least one central server to:
   (a) process received propane level information to provide displayable fluid level data, (b) forecast future propane levels utilizing at least historic propane level data; and a graphical user interface connected to the at least one central server via the Internet and configured to allow user input and to download information to be displayed so that (i) information concerning propane level data is organized and displayed graphically, (ii) information is at least displayed as a tank inventory listing customers and corresponding propane levels with levels above or below predetermined thresholds color-coded so that particular propane ranges can be easily identified, (iii) alarm messages are displayed whenever a remote monitoring unit has notified the central server that a predefined out-of-ordinary event has occurred, and (iv) alarm messages are displayed whenever a remote monitoring unit has notified the central server that a secondary sensor has detected a value is outside a predetermined range.

21. An apparatus for monitoring fluid levels of a consumable liquid in two or more remotely located storage tanks, comprising:

a means for obtaining data indicative of the amount of fluid in a storage tank;

a means for locally processing the data to determine whether predefined conditions are met;

a means for transferring the data to a central location; and a means for processing the data at the central location to (i) to provide displayable fluid level data, and (ii) to forecast future fluid levels utilizing at least stored fluid level data.

22. An apparatus for monitoring fluid levels in a fuel storage tank comprising:

at least one tank sensor providing information indicative of the amount of fluid in the storage tank;

at least one monitoring unit associated with each storage tank, said monitoring unit communicatively linked with at least one tank sensor so that information measured by the tank sensor is communicated to the monitoring unit and said monitoring unit including a processor to receive and process the communicated tank sensor information and a memory to store processed tank sensor information; and wherein at least one monitoring unit calculates predicted fluid levels based upon communicated tank sensor information and compares actual fluid levels to predicted fluid levels to determine whether a predefined out-of-ordinary event has occurred.

* * * * *

UNITED STATES PATENT AND TRADEMARK OFFICE
CERTIFICATE OF CORRECTION

PATENT NO. : 7,295,919 B2  Page 1 of 1
APPLICATION NO. : 11/097964
DATED : November 13, 2007
INVENTOR(S) : Richard L. Humphrey It is certified that error appears in the above-identified patent and that said Letters Patent is hereby corrected as shown below:

Col. 6, Line 36- please change "I/O port" to reflect -- *I/O port* --.

Col. 9, Line 24- please change "notices-such" to reflect -- notices—such --.

Signed and Sealed this

Second Day of September, 2008

JON W. DUDAS
*Director of the United States Patent and Trademark Office*